United States Patent
Lafleur et al.

(10) Patent No.: US 7,626,363 B2
(45) Date of Patent: Dec. 1, 2009

(54) LITHIUM BATTERY PACK MANAGEMENT AND SYSTEM THEREFOR

(75) Inventors: Phil Lafleur, Gloucester (CA); Robert Fry, Ottawa (CA); Kelly Gravelle, Poway, CA (US)

(73) Assignee: Transcore Link Logistics Corporation, Ontario (CA)

( * ) Notice: Subject to any disclaimer, the term of this patent is extended or adjusted under 35 U.S.C. 154(b) by 345 days.

(21) Appl. No.: 11/641,005

(22) Filed: Dec. 19, 2006

(65) Prior Publication Data

US 2008/0143297 A1   Jun. 19, 2008

(51) Int. Cl.
*H02J 7/00* (2006.01)
*H01M 12/00* (2006.01)

(52) U.S. Cl. .............................. 320/136; 320/134; 429/9

(58) Field of Classification Search ....................... 429/9, 429/49, 123, 90, 92, 96, 99, 122, 150; 320/103, 320/104, 118, 119, 116, 117, 121, 123, 126, 320/131, 133, 134, 135, 136, 137
See application file for complete search history.

(56) References Cited

U.S. PATENT DOCUMENTS

| | | | |
|---|---|---|---|
| 3,343,073 A * | 9/1967 | Mesenhimer ................ 307/49 |
| 5,631,102 A * | 5/1997 | Spillman et al. .............. 429/94 |
| 5,751,134 A | 5/1998 | Hoerner et al. |
| 5,796,225 A | 8/1998 | Fini, Jr. |
| 5,998,052 A | 12/1999 | Yamin |
| 6,140,799 A | 10/2000 | Thomasson |
| 2001/0000212 A1* | 4/2001 | Reipur et al. ................ 320/104 |
| 2001/0035756 A1* | 11/2001 | Kozlowski ................... 324/426 |
| 2005/0118466 A1* | 6/2005 | Lee .............................. 429/13 |
| 2005/0156577 A1 | 7/2005 | Sully |

OTHER PUBLICATIONS

International Search Report for corresponding PCT Application No. PCT/US2007/087955, dated May 28, 2009.

* cited by examiner

*Primary Examiner*—Edward Tso
*Assistant Examiner*—M'Baye Diao
(74) *Attorney, Agent, or Firm*—Caesar, Rivise, Bernstein, Cohen & Pokotilow, Ltd.

(57) ABSTRACT

A method for supplying power from a battery pack includes monitoring an output voltage of a battery pack, where the battery pack comprises a number of fractions and determining whether the output voltage is below a predetermined threshold. The method further includes adding at least one fraction of the number of fractions to the output voltage, when the output voltage is below the predetermined threshold and removing the at least one fraction, if previously added, when the output voltage is no longer below the predetermined threshold.

33 Claims, 3 Drawing Sheets ial. Another object of the present invention is to extend the
LITHIUM BATTERY PACK MANAGEMENT AND SYSTEM THEREFOR

FIELD OF THE INVENTION

The present invention is directed to management of battery packs that are used in portable devices and more particularly systems and management methods for lithium battery packs.

DESCRIPTION OF RELATED ART

The emergence of increased reliance on mobile devices in recent years has produced greater emphasis on battery life for those mobile devices. In applications such as mobile/remote asset monitoring/tracking, it is desirable that the battery life of a product extend to multiple years. Long battery life reduces the cost of ownership of a product and reduces maintenance requirements. To achieve long battery life in outdoor applications, lithium primary battery technology is often selected due to its high energy density and wide operating temperature range. Such lithium battery technology systems include, for example, lithium/thionyl chloride ($Li/SOCl_2$) and lithium/sulfuryl chloride ($Li/SO_2Cl_2$), both collectively known as Li/oxyhalide cells.

Further reductions in operating and maintenance costs can be achieved by accurately predicting the end-of-life of the battery. In applications where unscheduled battery failures are to be avoided, the disposal of partially discharged batteries results in a costly waste of residual capacity, and the accurate prediction of battery depletion allows maintenance to be scheduled in advance of a battery failure. However, the accuracy of such predictions of battery life is hampered by certain factors including the sharp roll-off of voltage near end-of-life.

A key limiting factor in the battery life of primary lithium batteries is the self-discharge current. When a lithium primary cell is first manufactured, the self-discharge current is relatively high. The flow of a self-discharge current inside the cell creates a protective film, called passivation, on the surface of the lithium reactant inside the cell. As the passivation layer increases, the self-discharge current required to complete its formation and eventually maintain it, reduces. During storage, the layer of passivation formed by the high initial self-discharge current is maintained by a minimal self-discharge current. The passivation layer is what affords primary lithium cells their extremely long shelf-life.

In contrast to storage conditions, any sustained non-negligible current draw while in operation will disturb the passivation layer, thereby leading to increased self-discharge current proportional to the surface area of the battery and the depth of disruption of the passivation layer. That effect is most apparent in batteries with high power densities, i.e. higher current sourcing capabilities.

The high power density is achieved by providing a large electrode surface area. That is typically accomplished by using spirally wound or "jelly roll" cell designs. An exemplary cell 10 is illustrated in FIG. 1. The cell 10 has an enclosure 18 that houses a multi-layer core 19, with a space 15 inside that is filled with liquid reactant. The cell has a negative terminal 16 and a positive terminal 17. High current sourcing capability is required by certain applications, such as a satellite-based mobile/remote asset monitoring/tracking system, where high power transmissions are required. In those applications, battery capacity loss due to self-discharge can even exceed the capacity used by the application electronics.

U.S. Pat. No. 5,998,052 discloses a composite battery where a lithium secondary battery is paired with a lithium primary battery, characterized in that the lithium primary battery, which has a low current sourcing capability, recharges the secondary lithium battery, which has a high current sourcing capability. Self-discharge of this composite battery is low because of the small surface area of the lower current sourcing primary lithium battery, and the charge state of the lithium secondary battery which is intentionally undercharged to minimize leakage. The pulse current sourcing capability of the composite battery is high because of the capability of the secondary battery. The secondary battery acts as a capacitor to effectively average the current sourcing requirements.

While excellent for sourcing infrequent pulses in low average current applications, the applicability of this design is limited to applications which have average current sourcing requirements that fall within the recharging capability of the lithium primary battery. That limitation avoids complete discharge of the secondary battery and the resulting battery failure. That problem is of particular importance at low temperatures, where the recharging capability of the lithium primary cells is significantly reduced.

Thus, there is a need in the prior art to have systems and methods which avoid the need to accommodate the limitations discussed above. There is also a need for methods and systems that can gauge battery life and provide accurate predictions of the end-of-life of the battery.

SUMMARY OF THE INVENTION

It is thus an object of the present invention to provide a reduction in the self-discharge current and resultant increase in battery life. Another object of the present invention is to provide excellent current sourcing capability at temperature extremes with high average current draws. Another object of the present invention is to provide accurate battery gas gauging. Another object of the present invention is to extend the life of spirally wound lithium primary battery packs, making them superior to composite batteries for certain applications.

To achieve the above and other objects, the present invention is directed to a method for supplying power from a battery pack. The method includes monitoring an output voltage of a battery pack, where the battery pack comprises a number of fractions and determining whether the output voltage is below a predetermined threshold. The method further includes adding at least one fraction of the number of fractions to the output voltage, when the output voltage is below the predetermined threshold and removing the at least one fraction, if previously added, when the output voltage is no longer below the predetermined threshold.

Preferably, the battery pack has at least two fractions, where each fraction of the at least two fractions has two cells. Two cells are arranged in series to provide additional voltage headroom. The step of adding the at least one fraction is performed over a period of a connection time interval, where the connection time interval exceeds a maximum duration of a required period of high current sourcing. The removal of the at least one fraction allows for passivation of a surface of a reactant in the at least one fraction to be maintained. The addition and removal of the fractions may be monitored and a useful lifetime for the battery pack may be predicted. The adding and removing steps may be performed such that a continuous power output is maintained during the adding and removing steps.

Also, the predetermined threshold may be a series of predetermined thresholds, where each value in the series represents a progressively lower threshold voltage. The battery pack fractions may be lithium oxyhalide cells, especially spirally wound lithium oxyhalide cells. The predetermined threshold may also be a low temperature operation threshold selected for low temperature operation.

Additionally, the present invention is also directed to a battery pack for supplying power to an application. The battery pack has a number of fractions, where each fraction of the number of fractions can contribute current to the output of the battery pack and the pack also includes a management circuit, connected to the number of fractions and configured to control the voltage output of the battery pack. The management circuit is configured to monitor the output voltage and determine whether the output voltage is below a predetermined threshold and configured to add or remove at least one fraction, based on the predetermined threshold, to maintain a minimum output voltage. The management circuit may include a number of integrated circuits (ICs) and discrete semiconductor components, connected to discrete resistors and capacitors, where values of the resistors and the capacitors determine the predetermined thresholds and time constants.

The present invention is also directed to a battery pack for supplying power to an application having a number of fractions of the battery pack and a management circuit, connected to the number of fractions and configured to control a voltage output of the battery pack. The management circuit includes a device for monitoring the output voltage of the battery pack, a device for determining whether the output voltage is below a predetermined threshold, a device for adding at least one fraction of the number of fractions to the output, when the output voltage is below the predetermined threshold and a device for removing the at least one fraction, if previously added, when the output voltage is no longer below the predetermined threshold.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

Figure 1:
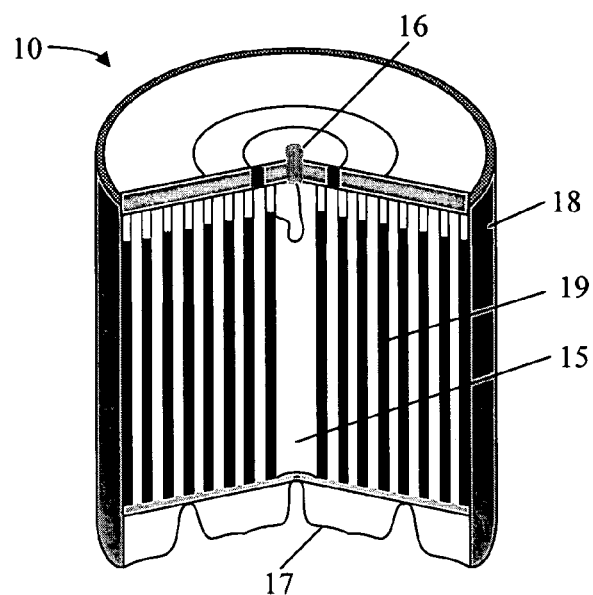
FIG. 1 is a schematic diagram of an exemplary cell, according to the prior art.

A preferred embodiment of the present invention will be set forth in detail with reference to the drawings, in which like reference numerals refer to like elements or operational steps throughout.

This invention reduces the operational self-discharge current of high power density cells, and thereby substantially mitigates the need to accommodate the limitations of the composite battery solution. Additionally, the invention allows for fractional battery gas-gauging. The invention combines the properties of primary lithium batteries and novel battery self-discharge management circuitry to yield a battery with high power density and relatively low self-discharge current resulting in long battery life.

The management of the battery pack is as follows. The application runs off an initial fraction of the battery back. As the first fraction approaches end-of-life and voltage droops significantly, the management circuitry connects the second fraction in parallel temporarily. Preferably, the connection time interval is chosen to exceed the maximum duration of the required period of high current sourcing, as dictated by the application.

Connecting the second fraction temporarily is important as voltage droop is often associated with excursions to temperature extremes (primarily cold) and high current sourcing conditions. Given the temporary nature of those temperature excursions and high current conditions, permanently connecting the second fraction, which has a much stronger drive capability than the first, would prevent the first fraction from sourcing any current. As such, any remaining capacity in the first fraction is wasted. Furthermore, at temperature extremes (primarily cold), the voltage could droop enough to require connecting an additional fraction early-on. As a result, switching it in permanently would mean that the additional fraction would no longer be allowed to repassivate, losing the benefits of reduced self-discharge as a result.

Initially, voltage droop on the first pack only occurs during periods of high current sourcing and/or low temperatures. During periods of medium and low current sourcing and moderate temperatures, the first fraction is still capable of supplying the required current without excessive voltage droop. As the first fraction continues to be discharged, it will eventually droop with even the slightest applied current draw at moderate temperature. At that point, the second fraction will be continually reconnected by the management circuitry. That process continues analogously for subsequent fractions until the entire pack is depleted.

Figure 2:
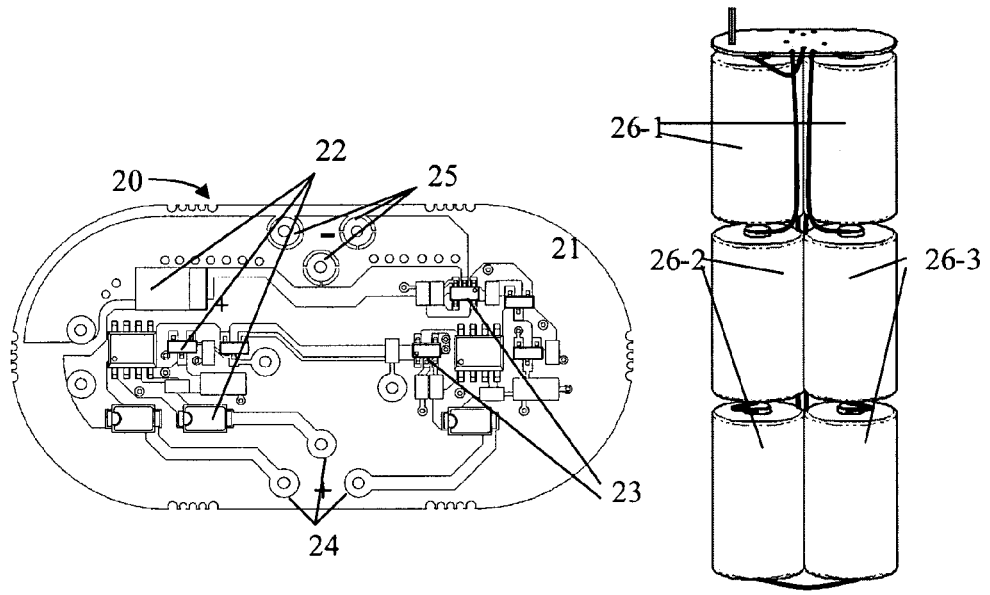
FIG. 2 is a schematic diagram of a printed circuit board having multiple fractions, according to at least one embodiment of the present invention.

An embodiment of the present invention is illustrated in FIG. 2, where a printed circuit board embodiment 20 is shown. This embodiment illustrated in FIG. 2 is for a battery pack divided into three fractions, each fraction having 2 "D" cells, for a total of 6 cells. The printed circuit board 21 has a series of components 22 mounted thereon, connected to voltage monitor ICs 23. As discussed above, multiple fractions of the battery pack are connected (24, 25) to the printed circuit board 20, where in this embodiment, the fractions are provided by pairs of cells 26-1 through 26-3. The management of the fractions is discussed in greater detail below. It should be noted that while the fractions are illustrated as pairs of cells, each fraction may be a number of cells and the number of fractions is varied based upon the application.

By dividing the pack into fractions, unused fractions of the battery are allowed to passivate, thereby stemming the self-discharge that would otherwise occur if all of the fractions were being discharged simultaneously. That dramatically improves the battery life. It also allows for more accurate assessments of actual life for the battery pack.

Even with the addition of the management circuitry, the pack retains its ability to sustain high average current sourcing at temperature extremes. Should the pack voltage droop at low temperature, fractions will continue to be switched in until the voltage is above the threshold or until all pack fractions have been connected. When the temperature returns to a nominal value, the unneeded pack fractions are switched out and allowed to repassivate.

Fractional battery gas gauging can be obtained by monitoring the outputs of the voltage monitoring circuitry. Those lines can be monitored and averaged over time to determine which pack fractions are being switched in. Averaging would be best performed over months to mitigate false indications due to temperature excursions. For example, no activity on any of the voltage monitoring lines would indicate that the pack is operating off of its first fraction. In contrast, sustained activity on the output of the first voltage monitor would indicate that the first fraction has been largely exhausted.

Figure 3:
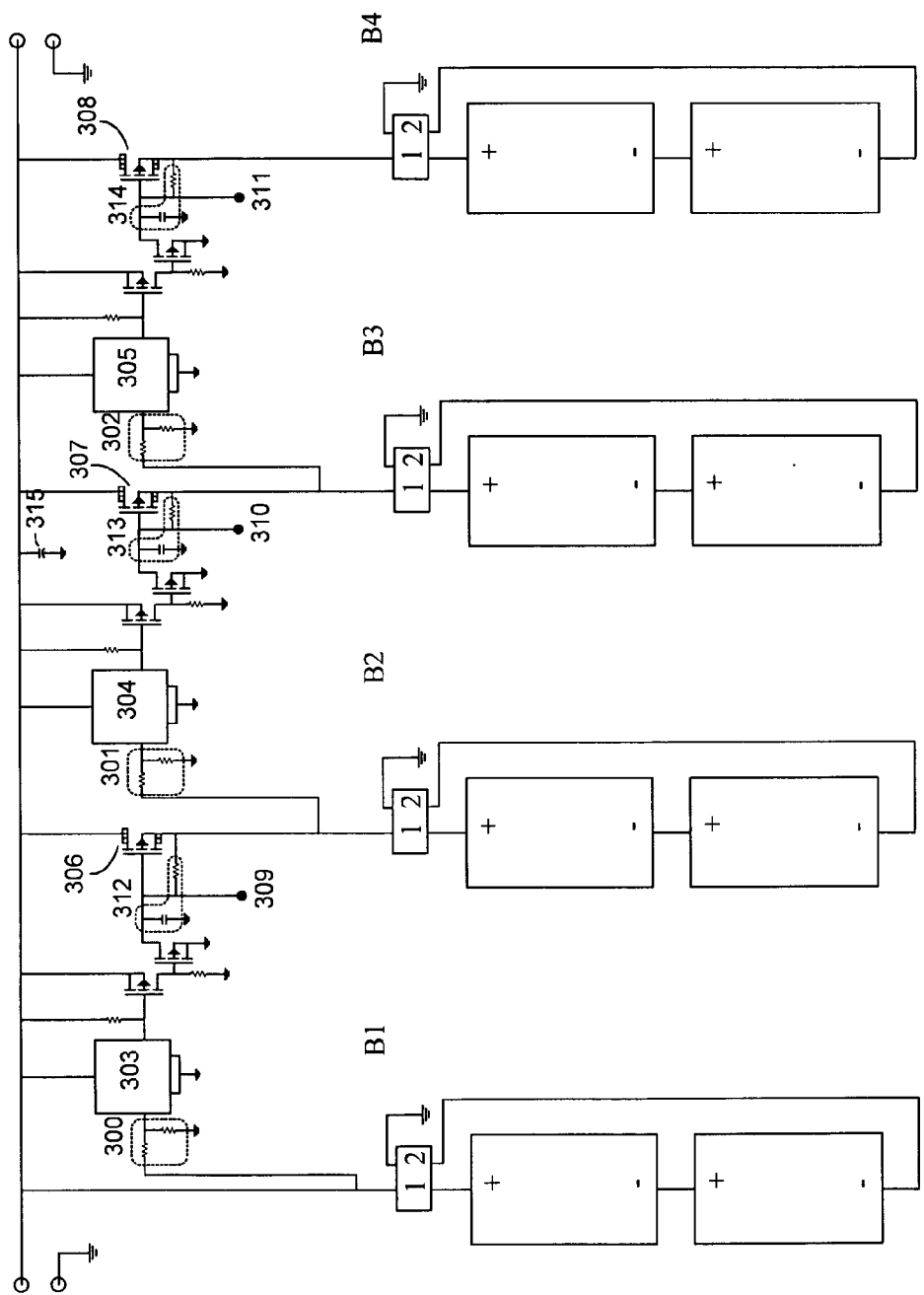
FIG. 3 is a schematic diagram of a management circuit, according to at least one embodiment of the present invention.

An exemplary battery management circuit is illustrated in FIG. 3. The embodiment shows four battery pack fractions B1 through B4. Each section of the circuit has a voltage threshold, determined by the resistor divider (300, 301, 302) values chosen in conjunction with the voltage monitor IC (303, 304, 305) thresholds, so that another fraction ($B_n$) is added to the output, once the output of the previous fraction ($B_{n-1}$) falls below that threshold. As the output voltage of the previous fraction ($B_{n-1}$) increases above a specific threshold, the fractions of the battery pack previously added ($B_n$ and possibly $B_{n+1}$, $B_{n+2}$ . . . ) are switched out according to the actions of the transistors (306, 307, 308) once the voltage at gate nodes (309, 310, 311) rise sufficiently to turn the transistors (306, 307, 308) off. The turn-off timing is governed by the RC time constant associated with circuits (312, 313, 314). The connection time interval is chosen to exceed the maximum duration of the required period of high current sourcing, as dictated by the application. The specific values of the components of the management circuit depend on the thresholds and time constants chosen, the application being powered by the battery pack and the desired responsiveness of the management circuit.

A capacitor 315 on the main bus ensures operation with a single fraction connected and to ensure continuous power if B1 is depleted or damaged, during the short interval where the transistors (306, 307, 308) are off. As a final detail, the voltage monitor circuitry can be designed to have progressively lower threshold voltages. That helps to ensure that latter fractions remain switched out and passivated until they are required.

Figure 4:
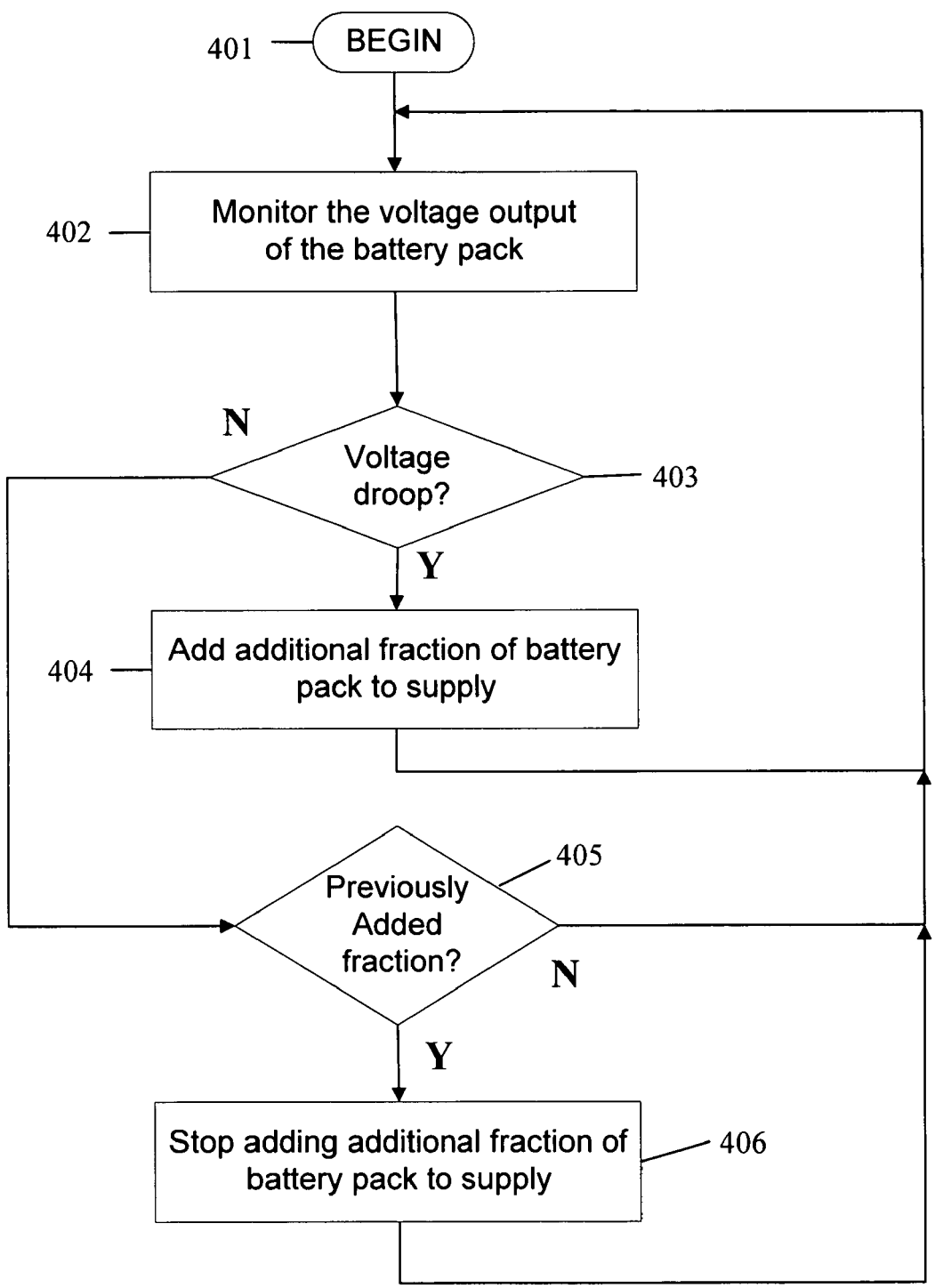
FIG. 4 is a drawing of a flow chart used in the management of power of the battery pack, according to at least one embodiment of the present invention.

The overall process of the management of the battery pack is shown in FIG. 4 as a flowchart. The process begins in step 401 and then the voltage output of the pack is monitored in step 402. In step 403, a determination is made whether the output voltage has dropped below a predetermined threshold. If the droop has occurred, then an additional fraction of the battery pack is added to the output, in step 404. If the voltage is above the threshold, then, in step 405, it is determined whether a fraction had been previously added, such that it can now be removed from contributing to the output. If a fraction had previously been added, it is removed in step 406, and the flow continues back to the voltage monitoring step 402. If no fraction had been previously added, then no fraction need be removed and the flow also continues back to the voltage monitoring step 402.

Switching from a primary battery to an alternate battery when a minimum voltage threshold is crossed has been previously demonstrated. Dynamically switching back and forth between any number of alternate batteries so as to reduce the disruption of the passivation layer in each battery, thereby reducing the overall capacity loss due to self-discharge; and to avoid premature disposal of partially discharged batteries in fluctuating temperature and load conditions has not been previously disclosed, and is a function of the present invention.

Included in the performance advantages of the present invention are a reduction in the self-discharge current and a resultant increase in battery life that allows for reduction in wasted battery capacity. The present invention also allows for excellent current sourcing capability at temperature extremes with high average current draws and allows for accurate battery gas gauging. The present invention extends the life of spirally wound lithium primary battery packs, making them superior to composite batteries for certain applications.

While a preferred embodiment has been set forth in detail above, those skilled in the art will readily appreciate that other embodiments can be realized within the scope of the invention. Therefore, the present invention should be construed as limited only by the appended claims.

What is claimed is:

1. A method for supplying power from a lithium oxyhalide battery pack, the method comprising the steps of:
monitoring an output voltage of the lithium oxyhalide battery pack, where the lithium oxyhalide battery pack comprises a number of fractions, the number of fractions including spirally wound lithium oxyhalide cells, at least one of the fractions contributing to the output voltage;
determining whether the output voltage is below a predetermined threshold;
adding an additional fraction of the number of fractions to the fractions contributing to the output voltages, when the output voltage is below the predetermined threshold by electrically connecting the additional fraction in parallel to the at least one contributing fraction; and
removing the additional fraction from the at least one contributing fraction when the output voltage is no longer below the predetermined threshold by electrically disconnecting the additional fraction from the at least one contributing fraction.

2. The method, as recited in claim 1, wherein the step of adding the at least one fraction is performed over a period of a connection time interval, where the connection time interval exceeds a maximum duration of a required period of high current sourcing.

3. The method, as recited in claim 1, wherein the step of monitoring the output voltage of the lithium oxyhalide battery pack comprises monitoring the output voltage of the lithium oxyhalide battery pack having at least two fractions.

4. The method, as recited in claim 3, wherein each fraction of the at least two fractions comprises two spirally wound lithium oxyhalide cells.

5. The method, as recited in claim 1, further comprising enabling repassivation of a surface of a reactant in the spirally wound lithium oxyhalide cell of the removed additional fraction.

6. The method, as recited in claim 1, further comprising monitoring the addition and removal of the fractions and predicting a useful lifetime for the lithium oxyhalide battery pack.

7. The method, as recited in claim 1, wherein the adding and removing steps are performed such that a continuous power output is maintained during the adding and removing steps.

8. The method, as recited in claim 1, wherein the step of determining whether the output voltage is below the predetermined threshold comprises determining whether the output voltage is below a series of predetermined thresholds, where each value in the series represents a progressively lower threshold voltage.

9. The method, as recited in claim 1, wherein the step of determining whether the output voltage is below the predetermined threshold comprises determining whether the output voltage is below a low temperature operation threshold.

10. A lithium oxyhalide battery pack for supplying power to an application, comprising:
a number of fractions of the lithium oxyhalide battery pack, the number of fractions including spirally wound lithium oxyhalide cells, each fraction of the number of fractions physically connected in parallel to contribute current to the output of the lithium oxyhalide battery pack when electrically connected to a current contributing fraction; and a management circuit, connected to the number of fractions to control the voltage output of the lithium oxyhalide battery pack;

the management circuit configured to monitor the output voltage of the lithium oxyhalide battery pack, determine whether the output voltage is below a predetermined threshold and configured to add or remove at least one fraction, based on the predetermined threshold, to maintain a continuous power output.

11. The lithium oxyhalide battery pack, as recited in claim 10, wherein the management circuit is configured to add the at least one fraction over a period of a connection time interval, where the connection time interval exceeds a maximum duration of a required period of high current sourcing.

12. The lithium oxyhalide battery pack, as recited in claim 10, wherein the lithium oxyhalide battery pack comprises at least two fractions.

13. The lithium oxyhalide battery pack, as recited in claim 12, wherein each fraction of the at least two fractions comprises two spirally wound lithium oxyhalide cells.

14. The lithium oxyhalide battery pack, as recited in claim 10, wherein the management circuit is configured to remove the at least one fraction to allow for passivation of a surface of a reactant in the at least one fraction to be maintained.

15. The lithium oxyhalide battery pack, as recited in claim 10, wherein the management circuit is configured to monitor the addition and removal of the fractions and provide a prediction of a useful lifetime for the lithium oxyhalide battery pack.

16. The lithium oxyhalide battery pack, as recited in claim 10, wherein the management circuit comprises a series of transistors, connected to resistors and capacitors, where values of the resistors and the capacitors determine the predetermined threshold and a time constant.

17. The lithium oxyhalide battery pack, as recited in claim 10, wherein the predetermined threshold comprises a series of predetermined thresholds, where each value in the series represents a progressively lower threshold voltage.

18. The lithium oxyhalide battery pack, as recited in claim 9, wherein the predetermined threshold comprises a low temperature operation threshold.

19. A lithium oxyhalide battery pack for supplying power to an application, comprising:

a number of fractions of the lithium oxyhalide battery pack, the number of fractions including spirally wound lithium oxyhalide cells, each fraction of the number of fractions physically connected in parallel to contribute current to the output of the lithium oxyhalide battery pack when electrically connected to a current contributing fraction; and a management circuit, connected to the number of fractions and configured to control a voltage output of the lithium oxyhalide battery pack wherein the management circuit comprises:

means for monitoring the output voltage of the lithium oxyhalide battery pack;

means for determining whether the output voltage is below a predetermined threshold;

means for adding at least one fraction of the number of fractions to the output voltage, by electrically connecting the at least one fraction to the fractions contributing current to the output of the lithium oxyhalide battery pack when the output voltage is below the predetermined threshold; and means for removing the added at least one fraction from the current contributing fractions when the output voltage is no longer below the predetermined threshold.

20. The lithium oxyhalide battery pack, as recited in claim 19, wherein the means for adding at least one fraction is configured to add the at least one fraction over a period of a connection time interval, where the connection time interval exceeds a maximum duration of a required period of high current sourcing.

21. The lithium oxyhalide battery pack, as recited in claim 19, wherein the lithium oxyhalide battery pack comprises at least two fractions.

22. The lithium oxyhalide battery pack, as recited in claim 21, wherein each fraction of the at least two fractions comprises two spirally wound lithium oxyhalide cells.

23. The lithium oxyhalide battery pack, as recited in claim 19, wherein the means for removing the at least one fraction is configured to allow for passivation of a surface of a reactant in the at least one fraction to be maintained.

24. The lithium oxyhalide battery pack, as recited in claim 19, further comprising means for monitoring the addition and removal of the fractions and means for predicting a useful lifetime for the lithium oxyhalide battery pack.

25. The lithium oxyhalide battery pack, as recited in claim 19, wherein the means for adding and removing are configured to maintain a continuous power output during operation of the means for adding and removing.

26. The lithium oxyhalide battery pack, as recited in claim 19, wherein the predetermined threshold comprises a series of predetermined thresholds, where each value in the series represents a progressively lower threshold voltage.

27. The lithium oxyhalide battery pack, as recited in claim 19, wherein the means for determining is configured to determine whether the output voltage is below a low temperature operation threshold.

28. method, as recited in claim 1, the lithium oxyhalide battery pack maintaining the output voltage regardless of a complete discharge of any one of the fractions.

29. The method, as recited in claim 1, wherein the step of adding the additional fraction of the number of fractions to the fractions contributing to the output voltage includes adding the additional fraction having a higher voltage output than one of the contributing fractions.

30. The lithium oxyhalide battery pack, as recited in claim 10, the lithium oxyhalide battery pack maintaining the output voltage regardless of a complete discharge of any one of the fractions.

31. The spirally wound lithium oxyhalide battery pack, as recited in claim 10, wherein the added at least one fraction has a higher voltage output than one of the current contributing fractions.

32. The lithium oxyhalide battery pack, as recited in claim 19, the lithium oxyhalide battery pack maintaining the output voltage regardless of a complete discharge of any one of the fractions.

33. The lithium oxyhalide battery pack, as recited in claim 19, wherein the added at least one fraction has a higher voltage output than one of the current contributing fractions.

* * * * *